United States Patent
Brignone et al.

(10) Patent No.: US 7,817,047 B1
(45) Date of Patent: Oct. 19, 2010

(54) CONFIGURING SENSOR NETWORK BEHAVIOR USING TAG IDENTIFIERS

(75) Inventors: Cyril Brignone, Mountain View, CA (US); Malena Mesarina, San Francisco, CA (US); John Recker, Mountain View, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 704 days.

(21) Appl. No.: 11/503,695

(22) Filed: Aug. 12, 2006

(51) Int. Cl.
*G08B 23/00* (2006.01)
(52) U.S. Cl. .................. 340/573.4; 235/375; 340/572.1
(58) Field of Classification Search ... 340/572.1–572.9, 340/573.4; 235/375–385
See application file for complete search history.

(56) References Cited

U.S. PATENT DOCUMENTS

| | | | | |
|---|---|---|---|---|
| 4,370,557 A | * | 1/1983 | Axmark et al. | 250/554 |
| 4,518,855 A | * | 5/1985 | Malak | 356/141.3 |
| 4,701,624 A | * | 10/1987 | Kern et al. | 250/554 |
| 4,833,458 A | * | 5/1989 | Bowman | 340/628 |
| 5,850,182 A | * | 12/1998 | Schuler | 340/578 |
| 6,624,739 B1 | * | 9/2003 | Stobbe | 340/5.2 |
| 2004/0087273 A1 | * | 5/2004 | Perttila et al. | 455/41.2 |
| 2005/0055235 A1 | * | 3/2005 | Mizuki et al. | 705/1 |
| 2006/0047545 A1 | * | 3/2006 | Kumar et al. | 705/7 |
| 2006/0158310 A1 | * | 7/2006 | Klatsmanyi et al. | 340/10.1 |
| 2007/0080819 A1 | * | 4/2007 | Marks et al. | 340/628 |
| 2007/0109100 A1 | * | 5/2007 | Jett et al. | 340/10.4 |
| 2007/0112825 A1 | * | 5/2007 | Cook et al. | 707/102 |
| 2008/0160984 A1 | * | 7/2008 | Benes et al. | 455/419 |

* cited by examiner

*Primary Examiner*—Davetta W Goins
*Assistant Examiner*—Edny Labbees

(57) ABSTRACT

Systems and methods for configuring behaviors of sensors and actuators in a sensor network include receiving behavior ID tag information uniquely identifying a behavior, and configuring behavior in the sensor network according to the identified behavior. Behavior configuration may be effected by programming the sensors and actuators directly, or by programming a computing node connected to the sensors and actuators.

19 Claims, 6 Drawing Sheets

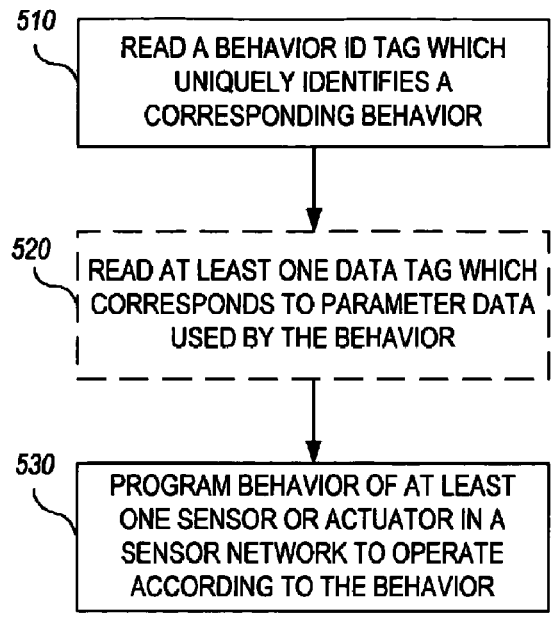
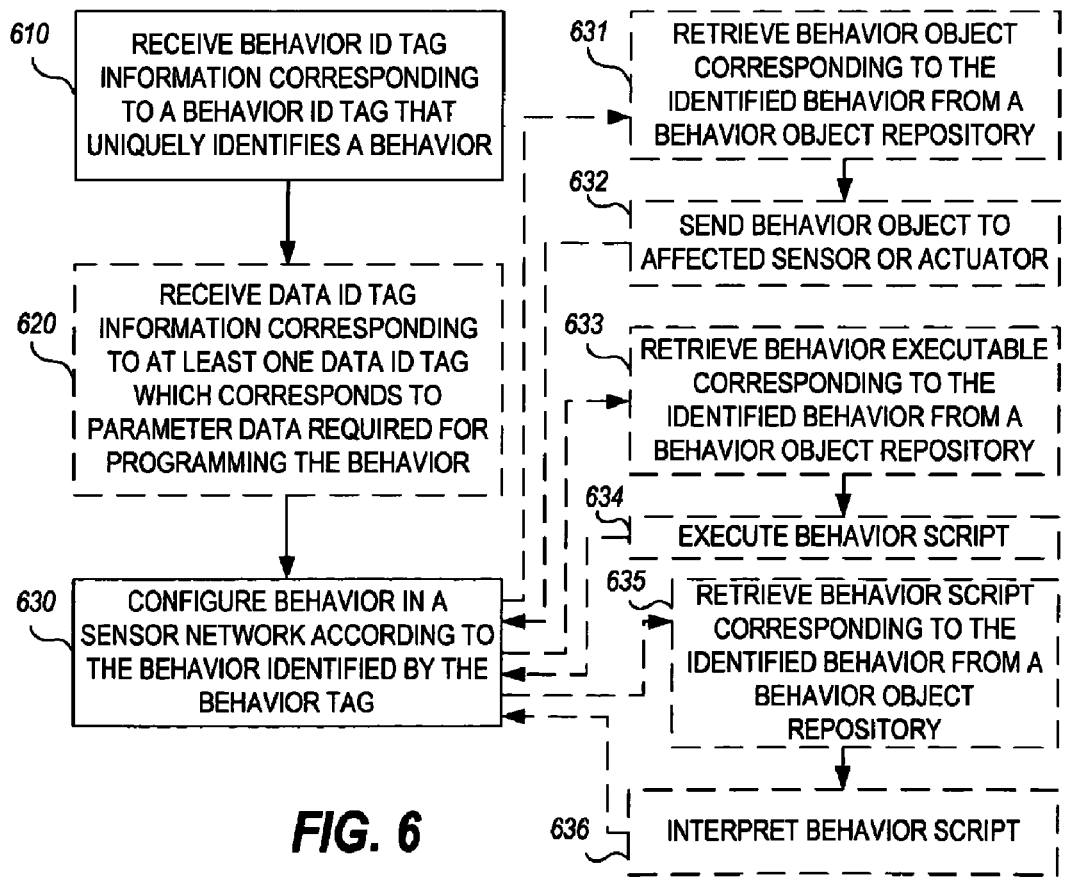

CONFIGURING SENSOR NETWORK BEHAVIOR USING TAG IDENTIFIERS

BACKGROUND OF THE INVENTION

The present invention relates generally to network systems, and more particularly to configuring sensor network behavior using tag identifiers.

Networks that include sensors and actuators that are responsive to information received from the sensors are used in a variety of applications across a large number of industries and systems.

For example, in an inventory warehouse building, sensors may be used to monitor and track objects entering and exiting the building. Sensors, which may be located, for example, at the loading dock doors of the building, may detect the presence of an object or person positioned at a dock door. A sensor may transmit sensed information such as an object or employee ID to a processor, which may in turn activate an actuator such as an automatic door opener.

The successful operation of a sensor network requires configuration of the behavior between sensors and actuators in the network. Configuration of a sensor network typically requires accessing a centralized configuration program executing on a computer. Often the user interface of the configuration program is nothing more than a series of commands typed at a run prompt. However, even in instances where the user interface to the configuration program is a more user-friendly graphical user interface, configuration of networked systems generally requires specialized knowledge of the system such as addresses and locations of various devices in the network.

It would be desirable to have alternative methods and apparatuses that allow simple and efficient configuration of sensor networks.

SUMMARY OF THE INVENTION

According to embodiments of the invention, a behavior ID tag that uniquely identifies a behavior is read at a tag reader, and behavior in a sensor network is configured according to the identified behavior.

In one embodiment, a method comprises receiving behavior tag information corresponding to a behavior ID tag that uniquely identifies a behavior, and configuring behavior of at least one sensor or actuator in a sensor network according to the behavior identified by the behavior ID tag.

In another embodiment, a computer readable storage medium tangibly embodies program instructions implementing a method comprising receiving behavior tag information corresponding to a behavior ID tag that uniquely identifies a behavior, and configuring behavior of at least one sensor or actuator in a sensor network according to the behavior identified by the behavior ID tag.

In another embodiment a system comprises at least one sensor or actuator each associated with a unique node tag ID, at least one tag reader which reads a behavior ID tag comprising tag information identifying a corresponding behavior, at least one computing node connected to the at least one tag reader to receive the tag information read by the at least one tag reader, and means for configuring behavior of at least one of the at least one sensor or actuator based on the received tag information.

BRIEF DESCRIPTION OF THE DRAWINGS

A more complete appreciation of this invention, and many of the attendant advantages thereof, will be readily apparent as the same becomes better understood by reference to the following detailed description when considered in conjunction with the accompanying drawings in which like reference symbols indicate the same or similar components, wherein:

FIG. 5 is a flowchart illustrating an exemplary embodiment of a method of configuring behavior in a sensor network; and FIG. 6 is a flowchart illustrating an exemplary embodiment of a method of configuring behavior in a sensor network.

DETAILED DESCRIPTION

Figure 1:
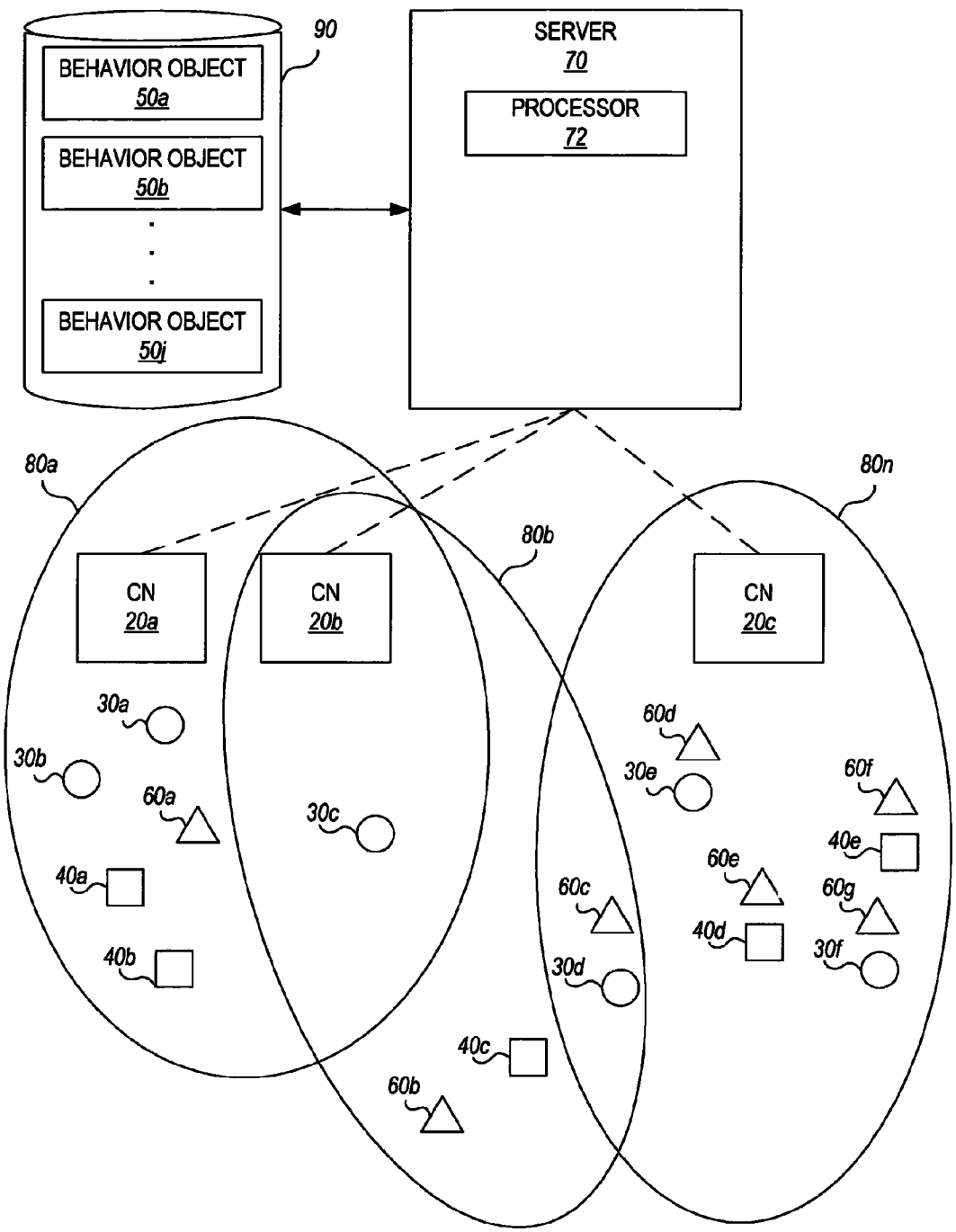
FIG. 1 is a block diagram of a system according to an embodiment.

For simplicity and illustrative purposes, the principles of the embodiments are described. Moreover, in the following detailed description, references are made to the accompanying figures, which illustrate specific embodiments. Electrical, mechanical, logical and structural changes may be made to the embodiments without departing from the spirit and scope of the embodiments.

The present invention is embodied by systems and methods for configuring behavior of sensors and actuators in a sensor network. As defined herein, a sensor is a device operable to measure or respond to a physical stimulus. An actuator is a device that is operable to move or control another device. A computing node is a processor connected to a network that is operable to perform a function. A node is a sensor, an actuator, a computing node, or any combination thereof that is connected to a network and addressed as a single entity. A sensor network is a network of nodes.

In embodiments of the invention, unique node identifier (ID) tags are associated with each node in a sensor network. Thus, a given node ID tag uniquely identifies a corresponding node (which may be a computing node, a sensor, an actuator, or combination thereof that is addressed as a single entity) in a sensor network. In an embodiment, the node ID tags are radio-frequency identification (RFID) tags (e.g., a device having an embedded microchip that listens for a radio query and responds by transmitting a unique ID code), each with a unique ID.

Also in embodiments of the invention, behaviors are uniquely identified by associated behavior ID tags, and data that may be used as parameter input to behaviors are also uniquely identified by associated data ID tags. Thus, a given behavior ID tag uniquely identifies a single corresponding behavior, and a given data ID tag uniquely identifies a single corresponding behavior parameter data value. In an embodiment, the behavior ID tags and the data ID tags are RFID tags, each with a unique ID.

To configure behavior in a sensor network, a user physically presents a behavior ID tag corresponding to a desired behavior to a tag reader connected to the sensor network and then presents to the tag reader any necessary parameter data ID tags corresponding to parameter data required to implement the desired behavior. If the desired behavior does not require any parameters for configuration, that particular behavioral configuration is complete once the behavior ID tag is read. If, however, the desired behavior does require one or more parameters, the user configures the parameter(s) of the desired behavior by subsequently presenting data ID tags associated with parameter data. In one embodiment, the data ID tags are presented to the tag reader in the order that the parameters are required. In one embodiment, the data ID tags are unique across all parameters and therefore the data ID tags may be presented to the tag reader in any order (after presenting the behavior ID tag associated with the desired behavior).

As an illustrative example, a behavior ID tag corresponding to a behavior such as "be triggered by data from <sensor x>" would require a parameter that identifies which sensor in the sensor network is to operate as <sensor x> for this behavior. The tag identifying <sensor x> for this behavior operates as a data ID tag for this configuration.

In another illustrative example, a behavior ID tag corresponding to a behavior such as "blink light <n> times" would require a parameter that indicates the value of n. A data ID tag designating a value for n would be required for this configuration.

When a behavior ID tag and any data ID tags that identify the values of any necessary parameters required by the behavior associated with the behavior ID tag are presented to a tag reader connected to a sensor network, at least one sensor or actuator is programmed to behave according to the behavior associated the behavior ID tag.

Turning now to an example, FIG. 1 illustrates a system 1 according to an embodiment. The system 1 includes at least one sensor network 80, shown as 80a, 80b, 80n. Each sensor network 80 includes at least one sensor 30, shown as 30a . . . 30f, and/or at least one actuator 40, shown as 40a . . . 40e. Each sensor network 80 also includes at least one computing node 20, shown as 20a, 20b, 20m connected to the sensor network 80. Any sensor 30, actuator 40, and/or computing node 20 may be connected to more than one sensor network 80.

As previously described, a sensor 30 is a device operable to measure or respond to a physical stimulus, such as temperature, light, sound, etc. A sensor 30 may be operable to detect a condition associated with an environment in a vicinity of the sensor. Examples of sensors 30 may include temperature sensors, ultrasound sensors, infrared sensors, cameras, etc.

As also previously defined, an actuator 40 is a device that is operable to move or control another device. Examples of actuators may include automatic doors, audible alarms, visual alarms, communications devices operable to send a communication, and almost any type of mechanical device operable to function in response to an actuating event.

In FIG. 1, each of the sensors 30, actuators 40, and computing node 20s are shown, for simplicity of both concept and illustration, as physically separate devices. However, it is to be understood that a sensor and an actuator may be integrated into a single physical device. It is to be further understood that any sensor 30, actuator 40, or combination sensor/actuator may further include intelligence (i.e., processing means) such that the particular sensor, actuator, or combination sensor/actuator also operates as a computing node. For example, an RFID tag reader, designated in FIG. 1 as triangle 60, includes both a sensor (tag ID detection), processing means (which determine the validity of a tag ID presented at sensor), and an actuator (which generates control signals to control another device). Thus, an RFID tag reader 60 may operate as each of a sensor, an actuator, and a computing node. The RFID tag reader 60 may be addressed and identified as a single entity (i.e., identified as a single node), or each of the sensor, actuator, and computing node associated with the RFID tag reader 60 may be addressed and identified as three different entities (i.e., identified as three different nodes).

The sensors 30, actuators 40, and computing nodes 20 in a given sensor network 80 are connected. "Connected" as used herein means electrically coupled, either physically (e.g., through wires, such as traces on an integrated circuit or an Ethernet cable and card) or remotely (e.g., through wireless communication). A connection may be a direct connection (e.g., without any intermediate components) or indirect (e.g., signals or communication passing through one or more intermediate components). For example, the sensors 30 and the actuators 40 may be connected to a computing node 20 via a wireless network, which may include one or more wireless network components. Signals may be sent from one node of the sensor network 80 to a second node by transmitting a wireless signal, which may be received by an intermediate (i.e., third) node in the network 80 and retransmitted to the second node. In another example, one or more of the sensors 30 and the actuators 40 may be connected to the computing nodes 20 directly through a wired connection, such as via a USB or serial cable/ports.

A computing node 20 may receive sensor data from one or more sensors 30 in a sensor network 80. The computing node 20 performs a function in response to the received sensor data. The function may actuate an actuator 40. For example, a computing node 20a may be configured to receive temperature data from a temperature sensor 30a in a sensor network 80a and to perform a function, such as a temperature comparison function in which the sensed temperature data is compared to a threshold. The computing node 20a may be configured to control an actuator 40a in the sensor network 80a, such as a cooling pump, to increase the volume of cooling fluid in an air conditioning system if the temperature rises above the threshold.

According to embodiments of the invention, behaviors may be assigned to sensors 30 and actuators 40 in a sensor network 80. In this regard, each of a set of nodes (sensors 30, actuators 40, computing nodes 20) of the sensor network 80, a set of behaviors, and, if required by behaviors in the set of behaviors, a set of parameter data, are identified using tags having unique tag identifiers (IDs). Systems implemented according to embodiments of the invention include at least one tag reader 60 connected the sensor network 80 and to at least one computing node 20 (which may be integrated into the tag reader) in the sensor network 80. In one embodiment the tag reader 60 is an RFID reader. In one embodiment, a tag is a physical device with an embedded RFID microchip that listens for a radio query from an RFID reader, and responds by transmitting an ID code unique to the set of nodes, behaviors, and data for the particular sensor network that it will be used in. In one embodiment, a tag is an RFID tag readable by an RFID reader. Other embodiments may utilize any technology that allows a tag implementation of a unique ID code and a detector capable of detecting and decoding the unique ID code on a tag.

Behavioral response by the system 1 to sensor data received from a sensor 30 in a sensor network 80 may be programmed by presenting a behavior ID tag corresponding to a given behavior object 50 to a tag reader 60 that is connected to a computing node 20 of the sensor network 80. For behavior objects 50 that require data (for example, parameters such as a node ID or a parameter value), an ID tag corresponding to each of the required parameter data is presented. In one embodiment, the data ID tags are presented to the tag reader 60 in the order required by the behavior object 50. The computing node 20 then programs at least one sensor 30 and/or actuator 40 in the sensor network 80 to behave according to the behavior identified by the behavior ID tag.

Behavior objects 50 may be stored in tag memory on the tag itself, or in a behavior repository 90. A behavior repository 90 may be integrated into the tag itself, may be integrated into a computing node 20, or may be remote from a computing node 20. A remote behavior repository 90 may be accessed through a server 70.

In one embodiment, a behavior object 50 is an executable—that is, it is machine readable program instructions that may be executed by a processor without compilation and linking. In this embodiment, any parameter data required by the executable that is read by a tag reader 60 connected to the sensor network 80 may be stored in predetermined computer registers or memory locations.

In an alternative embodiment, a behavior object 50 is a script of code that is processed, along with any parameters, at the time of execution. A behavior object 50 that is implemented as a script is processed by an interpreter, which may itself be an executable that performs the function of interpreting and effecting execution of behavior scripts.

In one embodiment, a server 70 may store a plurality of behavior objects 50a, . . . , 50j in a behavior repository local 90 local to the server 70. A computing node 20 may contact the server 70 to request retrieval of a particular behavior object 50 from the behavior repository 90. The server 70 includes a processor 72 which processes the server's request, retrieves the requested behavior object 50a, . . . , 50j, and sends the requested behavior object 50 to the requesting computing node 20.

The connection between the server 70 and computing nodes 20 may include a wireless network and/or a wired network. The connection between the computing nodes 20 and sensor network 80 may include a wireless network and/or a wired network.

Figure 2:
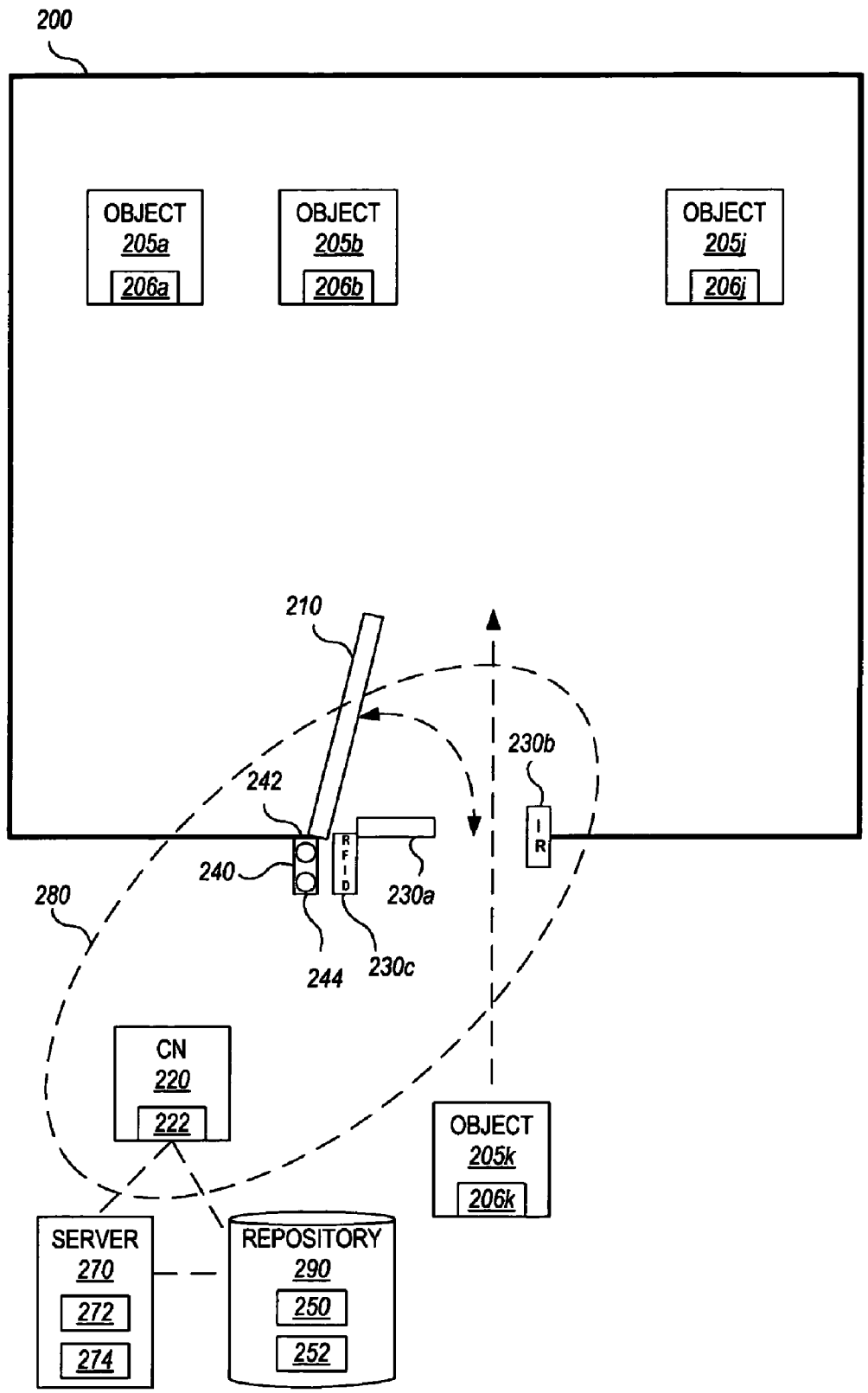
FIG. 2 is a block diagram of an exemplary system according to an embodiment.

Turning now to a practical example, an embodiment of a system operating in a warehouse 200 is shown in FIG. 2. The warehouse 200 is outfitted with an RFID enabled warehouse dock door 210. The RFID enabled warehouse dock door 210 may be equipped with a sensor network 280 including an RFID reader 230c that detects tag IDs 206 (shown as 206a . . . 206k) of objects 205 (shown as 205a . . . 205j) entering or exiting the warehouse 200 through the dock door 210. The sensor network 280 also includes an infrared (IR) sensor 230b that detects the passing of an object 205 or person through the dock door 210, a door sensor 230a that senses whether or not the dock door 210 is open, and a light column 240 which may be controlled to turn on and off both a red light 242 and a green light 244).

Suppose, for example, that it is desired to program the behavior of the dock door 210 as follows: if the dock door 210 is open and an object 205 (or person, not shown) is detected as passing through the door 210, then the RFID reader 230c should read the tag 206 of the object 205. If an RFID tag 206 identifying the object 205 (or person) is successfully read (and potentially authorized by a computing node functionality of the RFID tag reader 230c), then the green light 244 of the light column 240 should be turned on, and otherwise the green light 244 should be turned off. If the green light 244 is off, the red light 242 should be on and vice versa.

A script in a meta language for programming the behavior may include the following:

IF door.detect(ds) AND ir.detect(irs) THEN reader.read (rfid);
    IF reader.identify(rfid) THEN lc.gl(lca, ON); lc.rl(lca, OFF);
    ELSE lc.gl(lca, OFF); lc.rl(lca, ON)

where
    ds=tag ID of door sensor,
    irs=tag ID of IR sensor,
    rfid=tag ID of RFID reader,
    lca=tag ID of light column actuator,
    door.detect=door open detection function ("get door status from <ds>"),
    ir.detect=IR sensor detection function ("be triggered by IR sensor of <irs>")
    reader.read=RFID reader read function ("be triggered by RFID reader of <rfid>"),
    reader.identify=RFID reader identifying (and optionally authorization) function ("set light column identified by <lca>"),
    lc.gl=green light actuation function,
    lc.rl=red light actuation function, The sensor network 280 at the warehouse dock door 210 in the warehouse door example described above may be configured by creating a set of tags associated with each sensor and actuator in the network 280 and each desired behavior, and presenting them to the RFID tag reader 230c of the network 280 in an appropriate order, as discussed hereinafter.

With reference to FIG. 3, in one embodiment a single behavior ID tag 208 may be created. The tag 208 may include RFID capability 218. In one embodiment, the tag 208 contains an ID corresponding to each of the behaviors door.detect, ir.detect, reader.read, reader.identify. In another embodiment, the tag 208 includes sufficient memory 228 that the actual behavior scripts may be stored directly on the tag 208.

Behavior scripts corresponding to each of the behaviors door.detect, ir.detect, reader.read, reader.identify are written or obtained, and stored either in tag memory on the tag itself, or in a behavior repository 290.

Figure 3A:
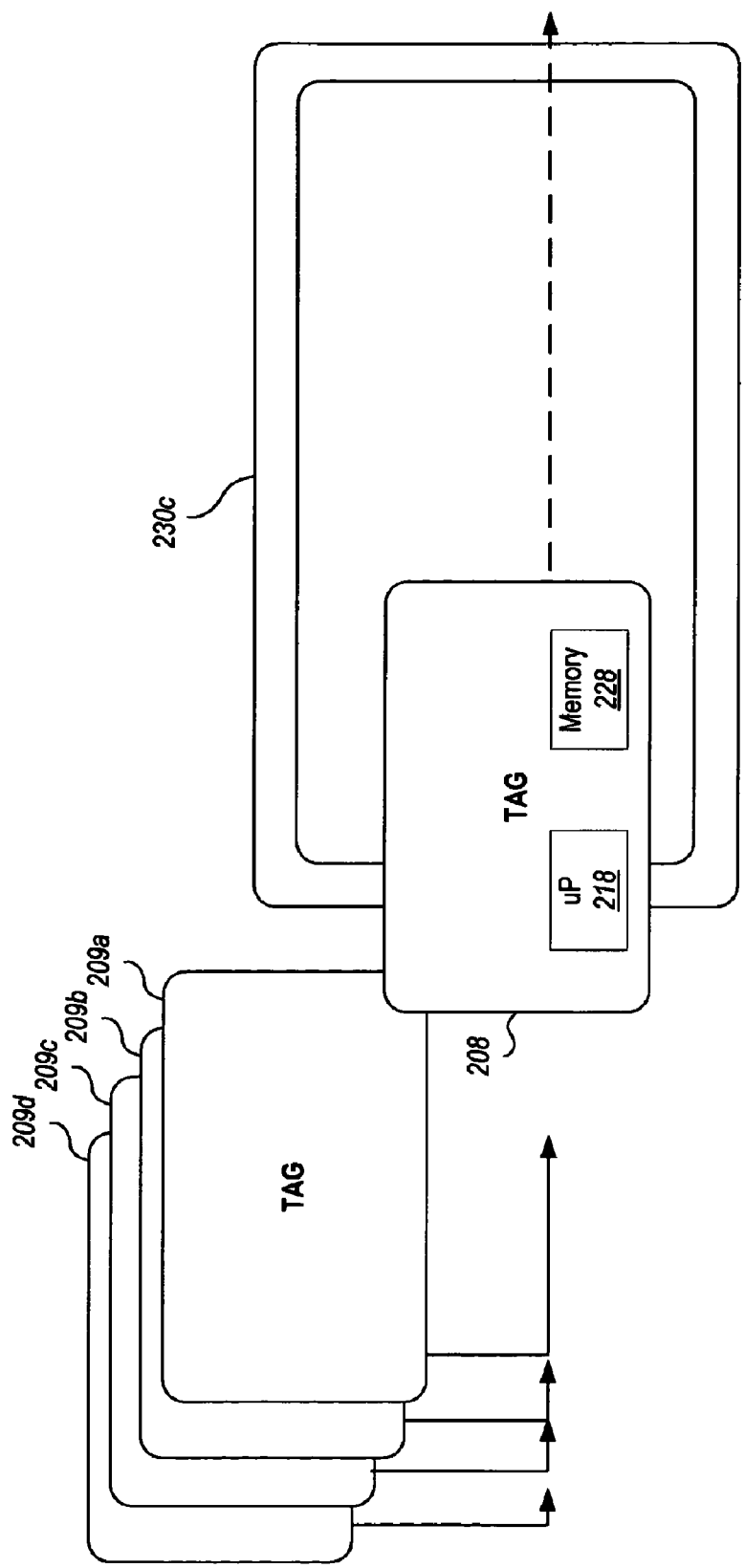
FIG. 3A is a front view of a tag reader illustrating the presentation of tags according to one embodiment for configuring behavior of the system of FIG. 2.

Node ID tags may also be created as follows:
    tag 209a: node ID of door sensor ds
    tag 209b: node ID of IR sensor irs
    tag 209c: node ID of RFID reader rfid
    tag 209d: node ID of light column lca FIG. 3A illustrates the set of tags 208, 209a, 209b, 209c, 209d defined above embodied on devices with embedded RFID tags. To configure the behavioral interaction of the sensors and actuators in the sensor network 280 at the warehouse dock door 210, a user presents the tags to (i.e. places within RF communication distance with) the RFID reader 230c of the warehouse dock door sensor network 280 in the following sequential order:

(1) tag 208 (ID of behavior scripts for door.detect, ir.detect, reader.read, and reader.identify)
    (2) tag 209a ("ds")
    (3) tag 209b ("irs")
    (4) tag 209c ("rfid")
    (5) tag 209d ("lca")

which translates to ("get door status from" "ds", "be triggered by IR sensor of" "irs", "be triggered by RFID reader of" "rfid", "set light column identified by" "lca".

Figure 3B:
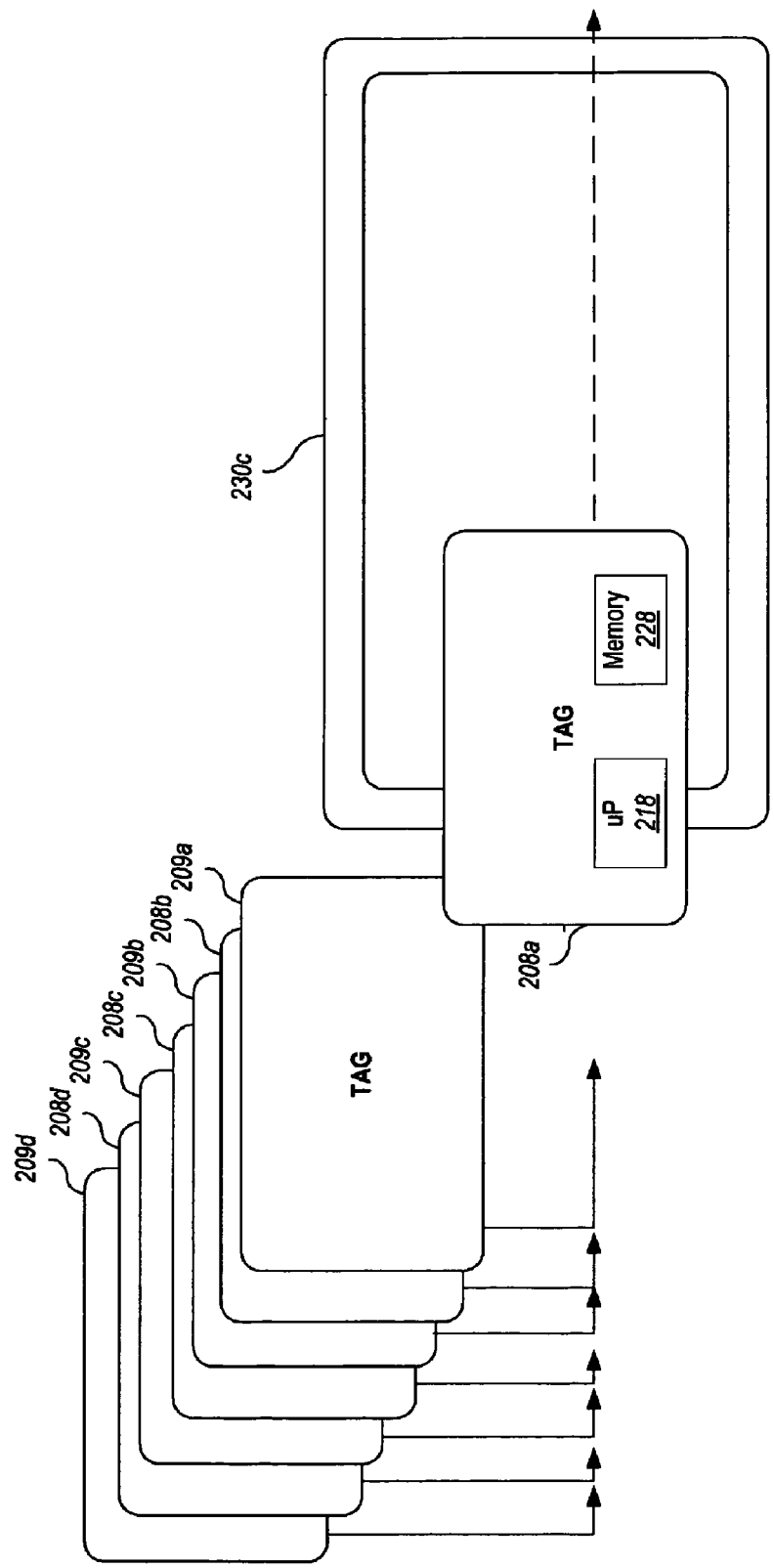
FIG. 3B is a front view of a tag reader illustrating the presentation of tags according to another embodiment for configuring behavior of the system of FIG. 2.

Alternatively, individual behavior tags may be created for each individual behavior as follows:
    tag 208a: behavior ID of door.detect
    tag 208b: behavior ID of ir.detect
    tag 208c: behavior ID of reader.read
    tag 208d: behavior ID of reader.identify In this case, as shown in FIG. 3B, to configure the behavioral interaction of the sensors and actuators in the sensor network 280 at the warehouse dock door 210, a user presents (e.g., swipes) the tags past the RFID reader 230c of the warehouse dock door sensor network 280 in the following sequential order:

(1) tag 208a ("get door status from")
(2) tag 209a ("ds")
(3) tag 208b ("be triggered by IR sensor of")
(4) tag 209b ("irs")
(5) tag 208c ("be triggered by RFID reader of")
(6) tag 209c ("rfid")
(7) tag 208d ("set light column identified by")
(8) tag 209d ("lca")

Referring back to FIG. 2, the RFID reader 230c is connected to a computing node 220. The computing node 220 receives the tag IDs from the RFID reader 230c and effects behavioral configuration corresponding to the received tag IDs. In one embodiment, the computing node 220 selects behavior executable(s) corresponding to particular behavior(s) that correspond to behavior tag ID(s) read by the RFID reader 230c. In another embodiment, the computing node 220 selects behavior script(s) corresponding to particular behavior(s) that correspond to behavior tag ID(s) read by the RFID reader 230c. In selecting a behavior executable or behavior script, the computing node 220 may contact a behavior repository 290 to retrieve the selected behavior object 250 corresponding to particular behavior(s) that correspond to received tag IDs. The computing node 220 may also contact the behavior repository 290 to retrieve one or more parameter values 252 corresponding to received tag IDs, which are utilized by the associated behavior object(s) 250 accordingly. In one embodiment, the computing node 220 may upload the behavior object corresponding to the desired behaviors to the various affected sensors and actuators of the sensor network 280 for execution or interpretation thereof by the respective affected sensors and actuators. Alternatively the computing node 220 may itself execute the behavior executable or interpret the behavior script corresponding to the desired behaviors of the sensors and actuators such that the computing node 220 operates as the intelligence of the affected sensors and actuators while the affected sensors and actuators operate merely as passive devices.

Figure 4:
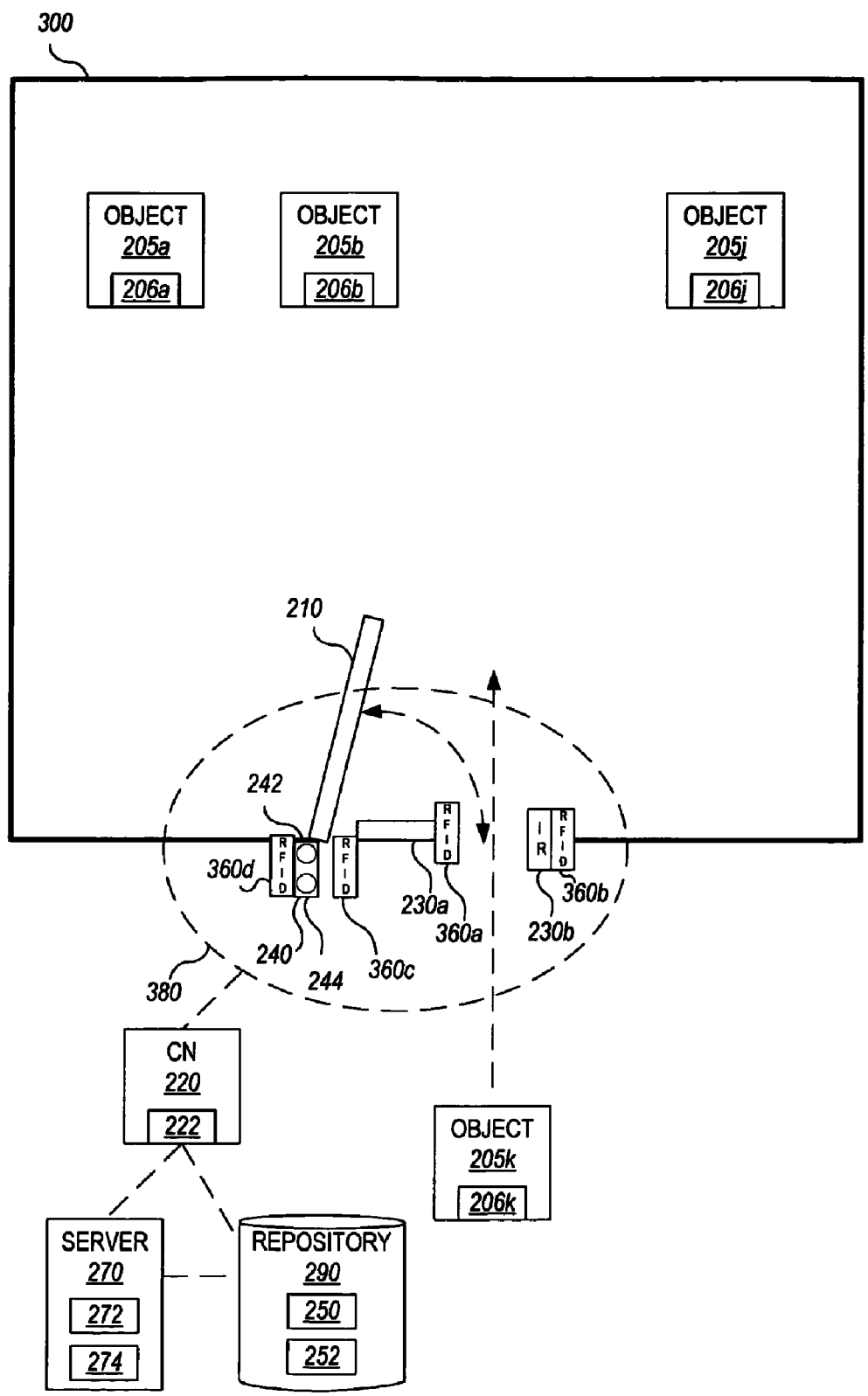
FIG. 4 is a block diagram of an exemplary system according to an embodiment.

FIG. 4 is a block diagram illustrating an embodiment of a system 300 having many of the same components of the system 200 of FIG. 2, in which each configurable node 230a, 230b, 230c, 240 of a sensor network 380 is connected to a corresponding tag reader 360a, 360b, 360c, 360d. In this embodiment, a user presents behavior and data ID tags to the respective tag reader 360a, 360b, 360c, 360d corresponding to the particular node being configured. For example, suppose it is desired that the light column 240 is triggered by sensor data generated by the RFID reader 330c. In this example, the light column 240 includes its own RFID reader 360d, configured with its own intelligence (e.g., processor). To configure the behavior of the light column 240, a user presents to the RFID reader 360d a behavior ID tag corresponding to the behavior "be triggered by <rfid>" followed by a data ID tag corresponding to the RFID reader 330c. The RFID reader 360d may be connected to a computing node 220 which retrieves the behavioral object 250 corresponding to the behavior ID tag read by the reader 360d, and then executes according to the behavior.

FIG. 5 illustrates an exemplary embodiment of a method of programming behavior of at least one sensor or actuator in a sensor network. The method includes the steps of reading a behavior ID tag that uniquely identifies a behavior at a tag reader (step 510), and programming the behavior of at least one sensor or actuator in a sensor network to operate according to the behavior (step 530). The method may also include a step of reading at least one data ID tag which corresponds to parameter data used by the behavior object (step 520).

FIG. 6 illustrates an exemplary embodiment of a method of configuring behavior of at least one sensor or actuator in a sensor network. The method includes the steps of receiving behavior ID tag information corresponding to a behavior ID tag that uniquely identifies a behavior (step 610). The method may also include the step of receiving data ID tag information corresponding to at least one data ID tag corresponding to data used to configure the behavior (step 620). The method also includes the step of configuring behavior in a sensor network according to the behavior identified by the behavior ID tag (step 630). In one embodiment, configuration of the behavior is performed by retrieving a behavior object corresponding to the identified behavior from a behavior object repository (step 631) and sending the behavior script to at least one affected sensor or actuator (step 632). In another embodiment, configuration of the behavior is performed by retrieving a behavior executable corresponding to the identified behavior from a behavior object repository (step 633) and executing the behavior executable to effect the behavior of at least one affected sensor or actuator (step 634). In another embodiment, configuration of the behavior is performed by retrieving a behavior script corresponding to the identified behavior from a behavior object repository (step 635) and interpreting the behavior script to effect the behavior of at least one affected sensor or actuator (step 636).

In summary, the present invention makes it possible to program specific sensors based on predefined generic behavior. This simplifies the installation and programming of sensors and actuators in a network environment where the behavior of a sensor or actuator depends on the context in which it is used.

It is to be understood that the above description is intended to be illustrative, and not restrictive. Many other embodiments will be apparent to those of skill in the art upon reviewing the above description. The scope of the invention should, therefore, be determined with reference to the appended claims, along with the full scope of equivalents to which such claims are entitled.

What is claimed is:

1. A method comprising:
   receiving behavior tag information corresponding to a behavior identifier (ID) tag, the behavior ID tag identifying a behavior associated with at least one sensor or actuator in a sensor network;
   receiving data tag information corresponding to at least one data ID tag, the data tag information identifying a data value of at least one parameter of the identified behavior; and
   configuring a behavior of the at least one sensor or actuator in the sensor network according to the behavior identified by the behavior ID tag and the data value of the at least one parameter.

2. The method of claim 1, wherein the step for receiving behavior tag information comprises:
   reading a radio-frequency identifier (RFID) behavior ID tag at a RFID tag reader.

3. The method of claim 1, the step of receiving data tag information comprises:
   reading, at a RFID tag reader, a radio-frequency identifier (RFID) data ID tag which identifies the data value used to configure the behavior.

4. The method of claim 1, wherein the step for receiving behavior tag information comprises:
   reading the behavior ID tag at a tag reader; and
   retrieving, from memory of the behavior ID tag, a behavior script corresponding to the behavior identified by the behavior ID tag.

5. The method of claim 1, wherein the step for configuring the behavior comprises programming the at least one sensor or actuator.

6. The method of claim 1, further comprising:
retrieving a behavior object corresponding to the identified behavior;
retrieving a data object corresponding to the identified data; and
sending the behavior object and the data object to the at least one sensor actuator to program the at least one sensor or actuator with the identified behavior as configured using the identified data value.

7. The method of claim 1, comprising:
retrieving a behavior executable corresponding to the identified behavior, the behavior executable comprising computer readable instructions for effecting behavior of the at least one sensor or actuator;
retrieving a data object corresponding to the identified data; and
executing the behavior executable and providing the behavior executable with access to the identified data value to implement behavior of the at least one sensor or actuator according to the identified behavior.

8. The method of claim 1, comprising:
retrieving a behavior script corresponding to the identified behavior, the behavior script comprising instructions that are interpretable by an interpreter at execution time for effecting behavior of the at least one sensor or actuator; and
interpreting the behavior script and identified data to implement behavior of the at least one sensor or actuator according to the identified behavior as configured with the identified data.

9. The method of claim 1, wherein the at least one sensor or actuator in the sensor network comprises a first sensor or actuator being configured with the behavior identified by the behavior ID tag to respond to data received by a second sensor or actuator as identified by the data tag information.

10. The method of claim 1, wherein:
the tag information is received at a computing node connected to the at least one sensor or actuator; and
programming the computing node to effect operation of the at least one sensor or actuator according to the behavior.

11. A computer readable storage medium tangibly embodying program instructions implementing a method, the method comprising:
receiving behavior tag information corresponding to a behavior identifier (ID) tag, the behavior ID tag identifying a behavior associated with at least one sensor or actuator in a sensor network;
receiving data tag information corresponding to at least one data ID tag, the data tag information identifying a data value of at least one parameter of the identified behavior; and
configuring a behavior of at least one sensor or actuator in the sensor network according to the behavior identified by the behavior ID tag and the data value of the at least one parameter.

12. The computer readable storage medium of claim 11, wherein the method step for configuring behavior comprises programming the at least one sensor or actuator.

13. The computer readable storage medium of claim 11, wherein the method step of receiving behavior tag information corresponding to a behavior ID tag comprises reading a radio-frequency identifier (RFID) behavior ID tag at a RFID tag reader.

14. The computer readable storage medium of claim 11, further comprising instructions for retrieving a behavior object corresponding to the identified behavior from a behavior object repository and a data object corresponding to the identified data, and sending the behavior object and the data object to the at least one sensor actuator to program the at least one sensor or actuator with the identified behavior.

15. A system comprising:
at least one sensor or actuator each associated with a unique node tag identifier (ID);
at least one tag reader which reads a behavior ID tag comprising behavior tag information identifying a corresponding behavior and which reads a data ID tag comprising data tag information identifying a data value of at least one parameter of the identified behavior;
at least one computing node connected to the at least one tag reader to receive the behavior tag information and the data tag information read by the at least one tag reader; and
a behavior configuration function which configures a behavior of at least one of the at least one sensor or actuator based on the received behavior tag information and the received data tag information.

16. The system of claim 15, wherein the at least one tag reader comprises a radio-frequency identifier (RFID) tag reader, and each of the behavior ID tag and the data ID tag is an RFID tag.

17. The system of claim 15, the computing node further comprising:
means for retrieving a behavior object corresponding to the identified behavior; and
means for sending the behavior object to the at least one sensor actuator to program the at least one affected sensor or actuator to operate according to the behavior.

18. The system of claim 15, further comprising:
means for retrieving a behavior executable corresponding to the behavior, the behavior executable comprising computer readable instructions for effecting behavior of the at least one sensor or actuator; and
a processor which executes the behavior executable to implement behavior of the at least one affected sensor or actuator according to the behavior.

19. The system of claim 15, further comprising:
means for retrieving a behavior script corresponding to the behavior, the behavior script comprising instructions that are interpretable at execution time for effecting behavior of the at least one affected sensor or actuator; and
an interpreter which interprets the behavior script at execution time to implement behavior of the at least one affected sensor or actuator according to the behavior.

* * * * *